US006338314B1

(12) United States Patent
Widrich

(10) Patent No.: US 6,338,314 B1
(45) Date of Patent: Jan. 15, 2002

(54) KNOCK-DOWN BED ASSEMBLY FOR RECEIVING DOMESTIC ANIMALS

(76) Inventor: Dion Widrich, 8 Oak Grove Court, Thornhill, Ontario (CA), L3T 2Z9

( * ) Notice: Subject to any disclaimer, the term of this patent is extended or adjusted under 35 U.S.C. 154(b) by 0 days.

(21) Appl. No.: 09/650,518

(22) Filed: Aug. 29, 2000

(51) Int. Cl.[7] .......................... A01K 1/035; A47C 19/16
(52) U.S. Cl. ........................................ 119/28.5; 5/110
(58) Field of Search ................................ 119/28.5, 482, 119/474; 5/200.1, 201, 110, 111, 114

(56) References Cited

U.S. PATENT DOCUMENTS

| | | | |
|---|---|---|---|
| 3,814,058 A | | 6/1974 | Thompson |
| 4,187,564 A | * | 2/1980 | Alomar ............................ 5/94 |
| D289,699 S | | 5/1987 | Runion |
| 5,072,694 A | * | 12/1991 | Haynes et al. ................. 119/19 |
| 5,577,465 A | * | 11/1996 | Cook .......................... 119/498 |
| D377,545 S | | 1/1997 | Iben |
| 5,860,389 A | | 1/1999 | Caldwell |
| 5,960,739 A | * | 10/1999 | Storm ......................... 119/28.5 |
| 5,992,348 A | * | 11/1999 | Harding ...................... 119/28.5 |

* cited by examiner

*Primary Examiner*—Thomas Price
(74) *Attorney, Agent, or Firm*—Marks & Clerk

(57) ABSTRACT

A bed for receiving domestic animals comprises four legs and elongate rod members which are disposed in interconnecting relation with one elongate rod member between each adjacent pair of legs. A first web of flexible material is securely attached at each of its opposed ends to the frame so as to span thereacross and present an animal receiving surface. A second web of flexible material is securely attached at each of its opposed ends to the frame so as to span thereacross, and is oriented substantially transversely to the first web of flexible material in supporting relation to the first piece of flexible material. Alternatively, a single web of flexible material presenting an animal receiving surface is securely attached at each of its opposed ends to elongate rod members disposed along the first and second ends of the frame so as to span thereacross. The single web of flexible material passes under reinforcing rods so as to span therebetween.

18 Claims, 4 Drawing Sheets

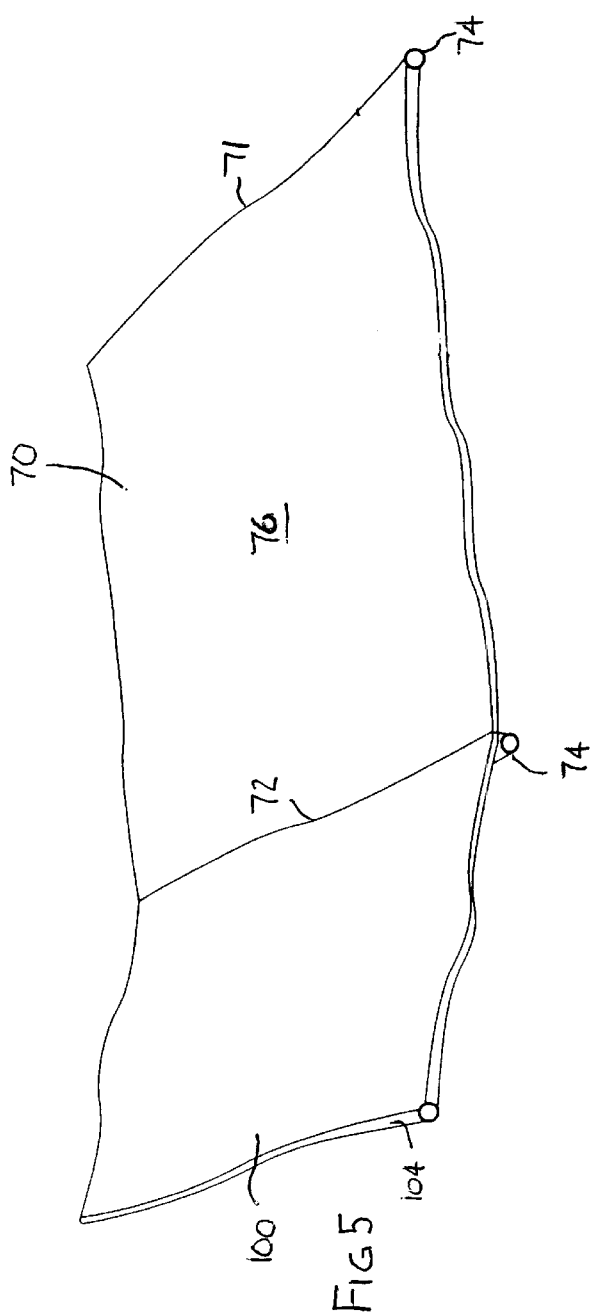
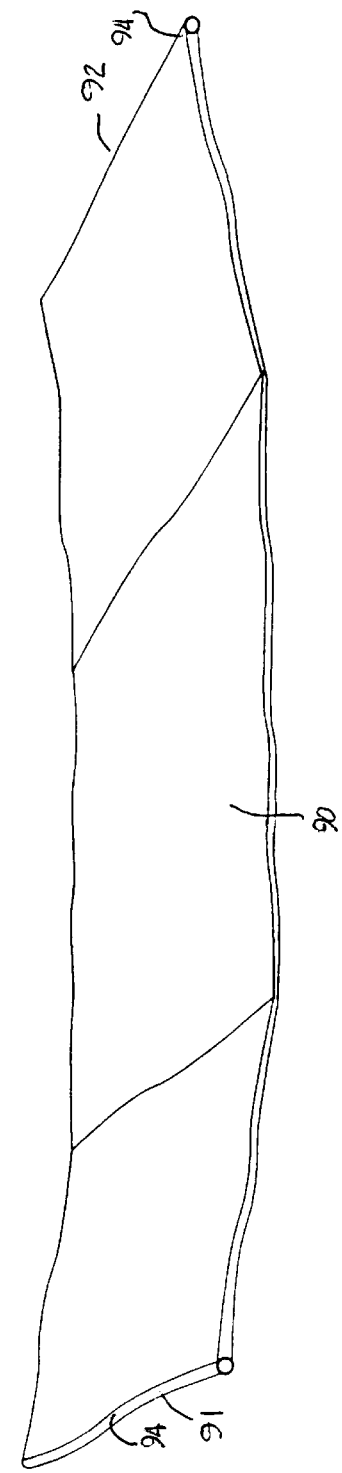

KNOCK-DOWN BED ASSEMBLY FOR RECEIVING DOMESTIC ANIMALS

FIELD OF THE INVENTION

This invention relates to beds for receiving domestic animals, and more particularly to such beds having a frame and a web of flexible material spanning across the frame.

BACKGROUND OF THE INVENTION

There are many different types of designs for beds for domestic animals, specifically pets. The most common type is a basket or shallow box-like structure that rests on a floor and presents an animal receiving surface, typically in the form of a pillow, that is marginally above floor level.

Problems with such basket or shallow box-like pet beds include the fact that they keep the pet close to a floor that may be quite cold, and where cold drafts may be present. Further, molding and rotting of such basket or shallow box-like pet beds is quite likely to occur due to the temperature difference between the floor and the animal's body.

More sophisticated beds for pets comprise a frame made either from wood or metal, with a fabric web of material that is supported by the frame so as to raise the pet a few inches or so off the floor. Such a frame and fabric pet bed is disclosed in U.S. Pat. No. 5,960,739 issued Oct. 5, 1999 to STORM, and entitled Bed for Animals. The bed for animals disclosed therein comprises a frame, a flexible sheet member suspended from the frame, and a rigid sheet member received within a pocket in the flexible sheet member so as to be supported by the flexible sheet member. Interconnection members are formed as side panels with sleeves formed at the ends thereof to receive horizontal cross members of the frame.

There are a number of significant problems associated with this particular prior art pet bed. The most significant problems are associated with the rigid sheet member, as it tends to be uncomfortable for pets, especially when using the pet bed for a long period of time. Further, the inclusion of the rigid sheet member within a pocket of the flexible sheet member is quite costly in terms of manufacturing. Also, the flexible sheet member must be cross-shaped, and accordingly is costly to manufacture.

Moreover, the flexible sheet member and the rigid sheet member are merely suspended from the frame. They do not interact with the frame in order to add to the overall structural integrity of the pet bed.

Another significant drawback of that particular pet bed is that it has four side walls that extend upwardly from the middle portion of the flexible sheet member that presents the animal receiving surface. It is well known that most dogs do not like to have to jump over a significant size lip in order to jump onto a raised surface. The design of the particular prior art pet bed taught in the U.S. Pat. No. 5,960,739 to Storm does not lend itself to having one lower side, such as is needed by many dogs.

It is an object of the present invention to provide a bed for receiving domestic animals, wherein an animal is raised off the floor.

It is another object of the present invention to provide a bed for receiving domestic animals, which bed has a frame and a flexible web of material spanning across the frame, with no sheet of hard material associated with the flexible web of material.

It is yet another object of the present invention to provide a bed for receiving domestic animals, which bed is more comfortable than prior art pet beds.

It is still another object of the present invention to provide a bed for receiving domestic animals, which bed is inexpensive to manufacture.

It is a further object of the present invention to provide a bed for receiving domestic animals, wherein the flexible web of material interacts with the frame in order to add to the overall structural integrity of the pet bed.

It is still a further object of the present invention to provide a bed for receiving domestic animals, which pet bed has only three side walls or end walls.

SUMMARY OF THE INVENTION

In accordance with one aspect of the present invention, there is provided a novel bed for receiving domestic animals. The bed comprises a support means having a substantially peripheral frame. A first web of flexible material is securely attached at each of its opposed ends to the frame so as to span thereacross and present an animal receiving surface. A second web of flexible material is securely attached at each of its opposed ends to the frame so as to span thereacross, and is oriented substantially transversely to the first web of flexible material in supporting relation to the first piece of flexible material.

In accordance with another aspect of the present invention, there is provided a novel bed for receiving domestic animals. The bed comprises a support means comprising four vertically oriented legs. A web of flexible material presents an animal receiving surface. Four substantially horizontal elongate rod members are disposed in interconnecting relation, with one elongate rod member between each adjacent pair of legs, thereby defining a rectangular frame having first and second ends, first and second sides, and four corners. A first reinforcing rod member is disposed in interconnecting relation between the pair of legs at the first end of the bed, and a second reinforcing rod member is disposed in interconnecting relation between the pair of legs at the second end of the bed, thereby defining the elevation of the animal receiving surface. The elongate rod members disposed along the first and second ends of the frame are set at a raised elevation above the elevation of the animal receiving surface. The web of flexible material is securely attached at each of its opposed ends to the the elongate rod members disposed along the first and second ends of the frame so as to span thereacross, and wherein the web of flexible material passes under the reinforcing rod members so as to span therebetween.

BRIEF DESCRIPTION OF THE DRAWINGS

The novel features which are believed to be characteristic of the present invention, as to its structure, organization, use and method of operation, together with furter objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 5 is a perspective view of the first web of flexible material and the third web of flexible material used in the preferred embodiment bed of FIG. 2;

FIG. 6 is a perspective view of the second web of flexible material used in the preferred embodiment bed of FIG. 2;

DETAILED DESCRIPTION OF THE PREFERRED EMBODIMENTS

Figure 1:
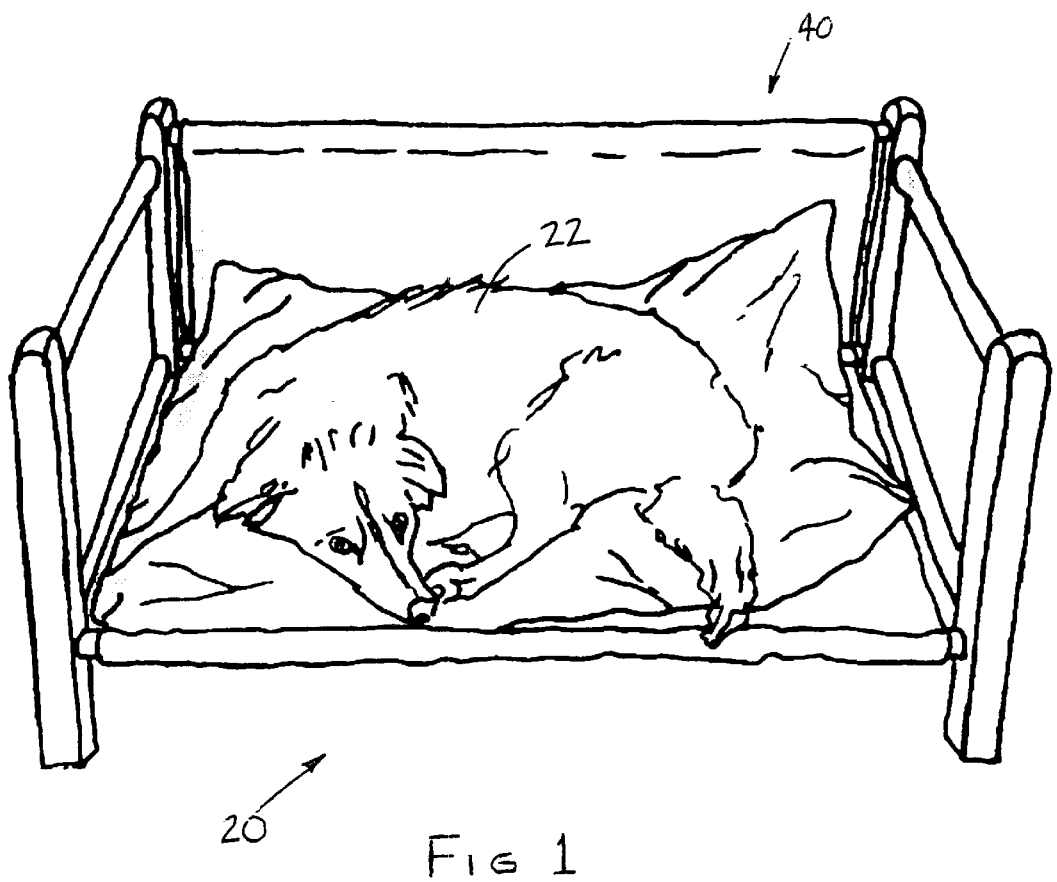
FIG. 1 is a perspective view of a preferred embodiment of the bed for receiving domestic animals according to the present invention, with an animal resting on a pillow placed on the bed.
Figure 2:
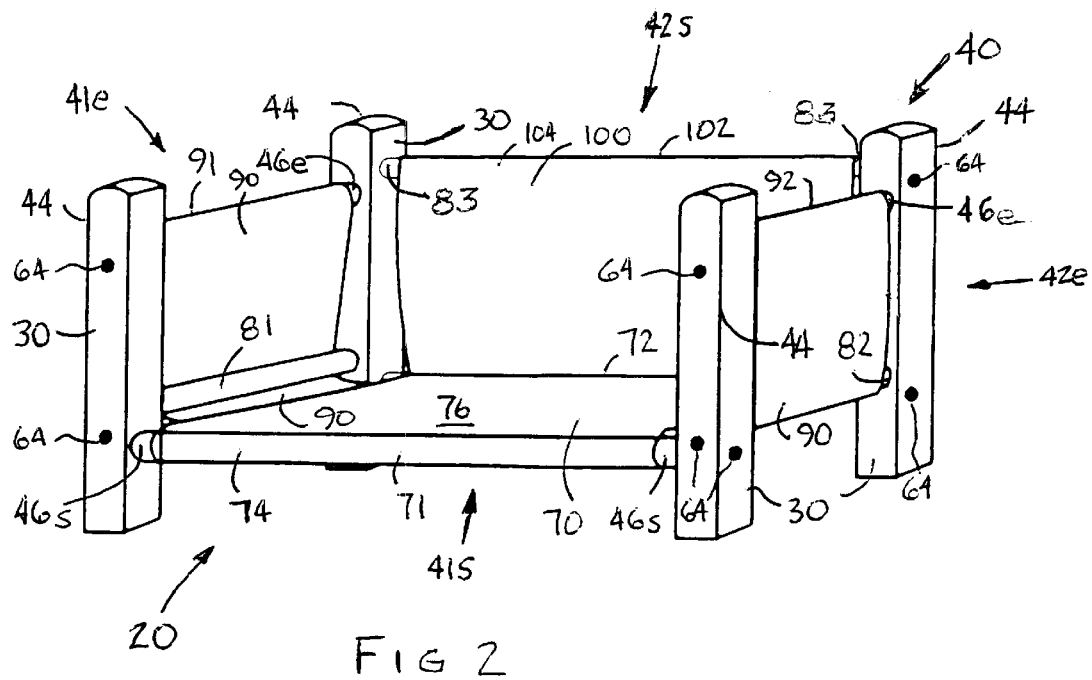
FIG. 2 is a perspective view similar to FIG. 1, but with the animal and pillow removed, and therefore showing only the bed per se.
Figure 3:
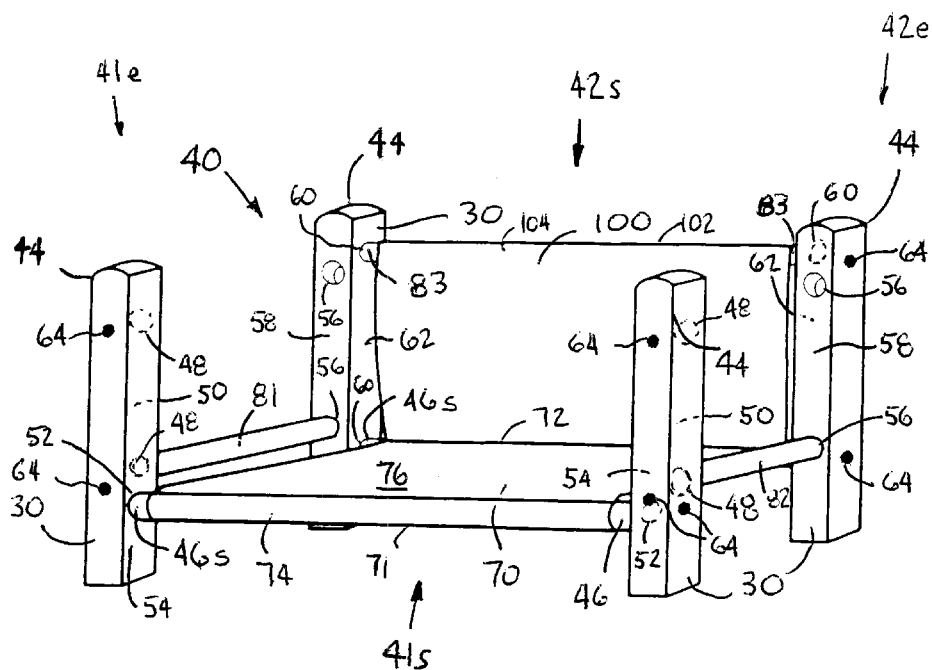
FIG. 3 is a perspective view similar to FIG. 2, but with the second web of flexible material removed for the sake of clarity.
Figure 4:
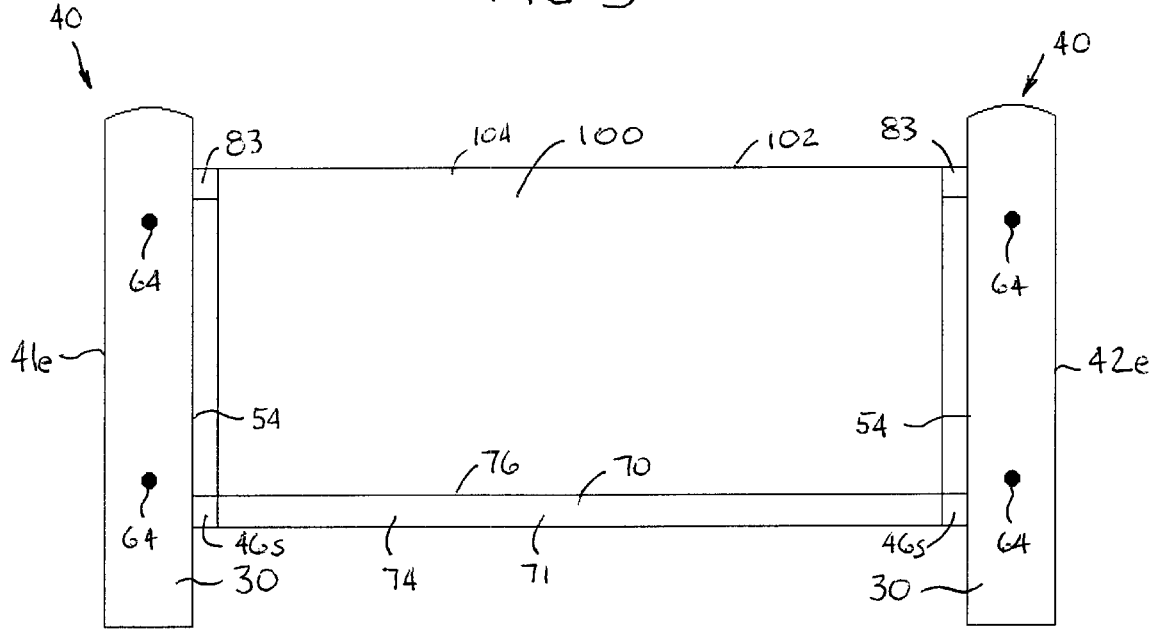
FIG. 4 is a front elevational view of the preferred embodiment of FIG. 2.

Reference will now be made to FIGS. 1 through 5, which show a preferred embodiment of the bed for receiving domestic animals according to the present invention, as indicated by the general reference numeral 20. The bed 20 is for receiving domestic animals, such as a dog 22, and comprises a support means that, in the preferred embodiment, includes four vertically oriented legs 30 disposed one at each corner of the rectangular frame. Preferably, the four legs 30 are made from wood, and preferably are rectangular in cross section, so as to be inexpensive and strong, and also for ease of manufacturing purposes. Other suitable materials, such as metal or plastic, may also be used to form the legs 30.

The support means has a substantially peripheral rectangular frame 40 having a first end 41e and a second end 42e, a first side 41s and a second side 42s, and four corners 44. As is apparent from the drawings, the four legs 30 are disposed one at each of the four corners 44 of the rectangular frame 40. The substantially peripheral rectangular frame 40 comprises elongate rod portions, and in the preferred embodiment as illustrated, the elongate rod portions of the rectangular frame 40 comprise four substantially horizontal elongate rod members 46s and 46e disposed in interconnecting relation, one elongate rod member between each adjacent pair of legs 30. The members 46s are disposed at the sides 41s and 42s; the members 46e are disposed at the sides 41e and 42e.

The ends of the elongate rod members 46s, 46e are received in co-operating apertures in the four legs 30. As can be best seen in FIG. 3, each of the legs 30 at the first side 41s of the frame 40, which corresponds to the front of the bed 20, has two apertures 48 along each surface 50 that faces towards the opposite second side 42s of the frame 40, and a single aperture 52 along an adjacent surface 54 that faces the respective opposite end of the frame 40. Each of the legs 30 at the second side 42s of the frame 40 has two apertures 56 along each surface 58 that faces towards the opposite first side 41s of the frame 40 and also two apertures 60 along an adjacent surface 62 that faces the respective opposite end of the frame 40. All of the apertures 48, 52, 56, and 60 are appropriately shaped and dimensioned to receive the ends of the elongate rod members 46 therein. Threaded fasteners 64 are inserted through co-operating bore holes (not shown) that are axially aligned one with each of the apertures 48, 52, 56, and 60 so as to engage the ends of the respective one of the inserted elongate rod members 46s and 46e, thereby providing secure connection of the four elongate rod members 46 to the four legs 30.

As can be seen in FIGS. 1 through 4, and as can be best seen in FIG. 5, a first web of flexible material 70 has a first end 71 and a second end 72, and at least one loop of material 74 disposed at each end 71, 72 thereof. The loops of material 74 are dimensioned to receive the elongate rod members 46s therein. In the preferred embodiment as illustrated, the loops of material 74 at the ends 71, 72 of the first web of flexible material 70 are substantially continuous across the width of the first web of flexible material 70, for purposes of strength and also ease of insertion of the associated elongate rod member 46s.

With an elongate rod member 46s inserted in each of the loops of material 74 at each of the ends 71, 72 of the first web of flexible material 70, and with the elongate rod member 46s interconnected between adjacent pairs of legs 30 at the ends of the frame 40, the first web of flexible material 70 is securely attached at each of its opposed ends 71, 72 to the frame 40 so as to span thereacross and present an animal receiving surface 76.

The elongate rod members 46s disposed along the first and second sides 41s, 42s of the frame 40 are set at a common elevation one with the other, thereby defining the elevation of the animal receiving surface 76. The animal receiving surface 76 is elevated off the floor in order to keep an animal occupying the bed 20 of the present invention away from a floor that may be quite cold, and where cold drafts may be present.

The elongate rod members 46e disposed along the first and second ends 41e, 42e of the frame 40 are set at a raised common elevation one with respect to the other, above the elevation of the animal receiving surface 76.

A first reinforcing rod member 81 is disposed in interconnecting relation between the pair of legs 30 at the first end 41e of the frame 40, and a second reinforcing rod member 82 is disposed in interconnecting relation between the pair of legs 30 at the second end 42e of the frame 40. The first and second reinforcing rod members 81, 82 are set at an elevation slightly above the elevation of the animal receiving surface 76; or in other words, slightly above the elevation of the elongate rod members 46s disposed along the first and second sides 41s, 42s of the frame 40. This arrangement is at least in part for purposes of construction, so that the receiving apertures for each reinforcing rod member are offset, so as to thereby accommodate the threaded fasteners 64 that secure the elongate rod members 46s to their respective legs 30.

As can be best seen in FIG. 6, a second web of flexible material 90 has a first end 91 and a second end 92, and at least one loop of material 94 disposed at each of the ends 91, 92 thereof. The loops of material 94 are dimensioned to receive the elongate rod members 46e therein. In the preferred embodiment as illustrated, the loops of material 94 at the ends 91, 92 of the second web of flexible material 90 are substantially continuous across the width of the second web of flexible material 90, for purposes of strength and also ease of insertion of the associated elongate rod member 46e.

With an elongate rod member 46e inserted in each of the loops of material 94 at each of the ends 91, 92 of the second web of flexible material 90, and with the elongate rod member 46e interconnected between adjacent pairs of legs 30 at the sides 41e, 42e of the frame 40, the second web of flexible material 90 is securely attached at each of its opposed ends 91, 92 to the frame 40 so as to span thereacross, but not in quite the same manner as does the first web of flexible material 70. The second web of flexible material 90 passes under the first and second reinforcing rod members 81, 82 and then spans across the frame 40 between the first and second reinforcing rod members 81, 82, so as to be oriented substantially transversely to the first web of flexible material 70 and so as to be in supporting relation to the first web of flexible material 70. That is to say the second web 90 passes under the animal receiving surface 76, so that the weight of an animal when present on the receiving surface 76 is supported by both webs 70 and 90.

A third reinforcing rod member 83 is disposed in interconnecting relation between the pair of legs 30 at the second side 42s of the frame 40, and is set at a raised elevation above the elevation of the animal receiving surface 76, preferably adjacent the top of the legs 30.

A third web of flexible material 100 extends outwardly from one end of the first web of flexible material 70, at the second side of the frame 40, and extends upwardly so as to terminate at an outer end 102. The third web of flexible material 100 has at least one loop of material 104 disposed at the outer end 102 thereof, the loop of material 104 at the outer end 102 being dimensioned to receive the third reinforcing rod member 83 therein. In a manner similar to the other loops, the loops of material 104 at the outer end 102 of the third web of flexible material 100 is substantially continuous across the width of the third web of flexible material 100, for purposes of strength and also ease of insertion of the associated elongate reinforcing rod member. As can be best seen in FIGS. 2 and 3, the third web of flexible material 100 defines a rear wall of the bed 20, with the third reinforcing rod member 83 thereby defining the height of the rear wall.

Figure 7:
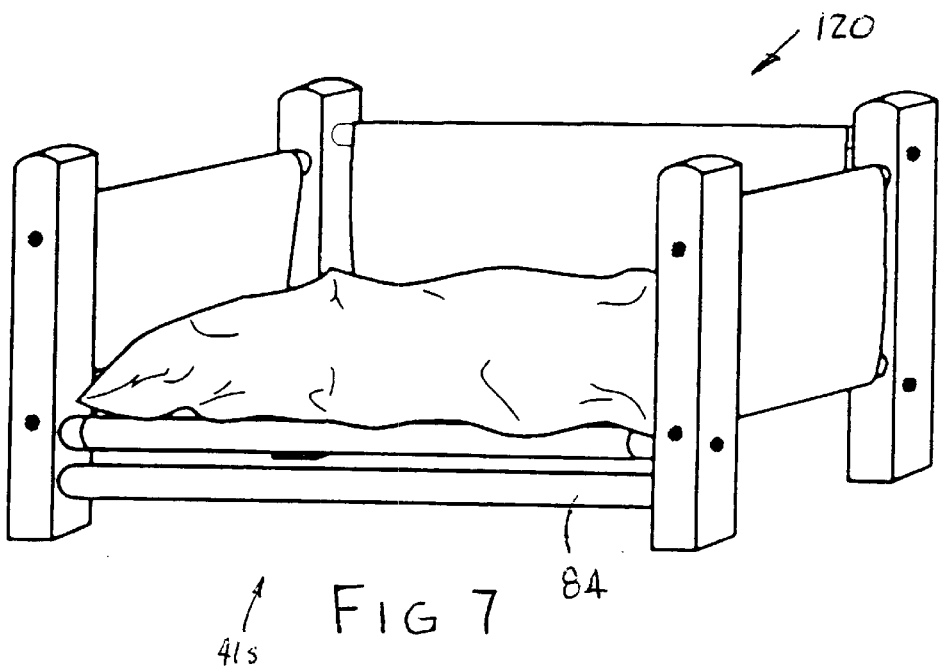
FIG. 7 is a perspective view of a first alternative embodiment of the bed for receiving domestic animals according to the present invention; and, FIG. 8 is a perspective view of a second alternative embodiment of the bed for receiving domestic animals according to the present invention.

A first alternative embodiment of the bed for receiving domestic animals according to the present invention, as indicated by the general reference numeral 120 in FIG. 7, is almost identical to the preferred embodiment bed 20 for receiving domestic animals, except that there is a fourth reinforcing rod member 84 disposed in interconnecting relation between the pair of legs 30 at the first side 41s of the frame 40. The fourth reinforcing rod member 84 is set at an elevation sightly below the elevation of the animal receiving surface (not specifically shown), and thereby provides increased frame strength at the front of the bed 20, where animals ingress into and egress from the bed 20. The fourth reinforcing rod member 84 is typically included in larger model beds 20 that are meant to support animals of relatively high weights.

Figure 8:
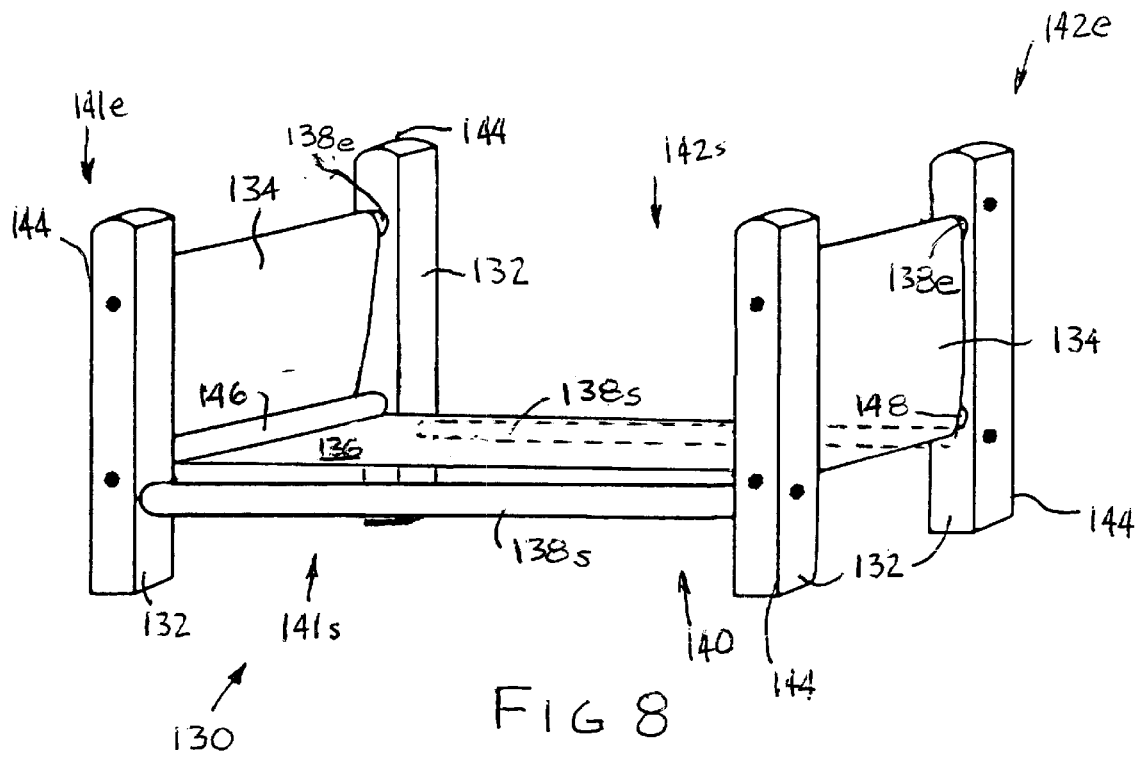

A second alternative embodiment of the bed for receiving domestic animals according to the present invention, as indicated by the general reference numeral 130, is illustrated in FIG. 8. The bed 130 comprises a support means comprising four vertically oriented legs 132. A web of flexible material 134 presents an animal receiving surface 136. Two substantially horizontal elongate rod members 138s are disposed in interconnecting relation, one elongate rod member 138s between each adjacent pair of legs 132 across the sides 141s and 142s, and two substantially horizontal elongate rod members 138e are disposed across the sides 141e and 142e, thereby defining a rectangular frame 140 having a first end 141e, a second end 142e, a first side 141s, a second side 142s, and four corners 144.

A first reinforcing rod member 146 is disposed in interconnecting relation between the pair of legs 132 at the first end 141e of the bed 130, and a second reinforcing rod member 148 is disposed in interconnecting relation between the pair of legs 132 at the second end 142e of the bed 130, thereby defining the elevation of the animal receiving surface 136. The elongate rod members 138e disposed along the first and second ends 141e, 142e of the frame 140 are set at a raised elevation above the elevation of the animal receiving surface 136. The web of flexible material 134 is securely attached at each of its opposed ends 141e, 142e to the the elongate rod members 138 disposed along the first and second ends 141e, 142e of the frame 140 so as to span thereacross, and the web of flexible material 134 passes under the first and second reinforcing rod members 146, 148, so as to span therebetween.

It should be apparent that the webs 70, 100 are generally formed of one length of fabric, with the intermediate loop 74 being formed therein. However, that intermediate loop 74 can be eliminated, and the web 70, 100 passed under the elongate rod member 46s at side 42s. On the other hand, the presence of the intermediate loop 74 and the elongate rod member 46s being passed therethrough, as otherwise taught herein, provides for the web 70—which defines the animal supporting surface 76—to support the weight of an animal thereon between the elongate rod members 46s, without regard to any strain being placed on the web member 100 at the rear side 42s of the bed 20.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element.

Moreover, use of the terns "he", "him", or "his", is not intended to be specifically directed to persons of the masculine gender, and could easily be read as "she", "her", or "hers", respectively.

What is claimed is:

1. A bed for receiving domestic animals, said bed comprising:
   a support means having a substantially peripheral frame;
   a first web of flexible material securely attached at each of its opposed ends to said frame so as to span thereacross and present an animal receiving surface; and,
   a second web of flexible material securely attached at each of its opposed ends to said frame so as to span thereacross, and oriented substantially transversely to said first web of flexible material in supporting relation to said first piece of flexible material.

2. The bed of claim 1, wherein said substantially peripheral frame comprises elongate rod portions.

3. The bed of claim 2, wherein said first web of flexible material has at least one loop of material disposed at each end thereof and said second web of flexible material has at least one loop of material disposed at each end thereof, said loops of material being dimensioned to receive said elongate rod portions therein.

4. The bed of claim 3, wherein said substantially peripheral frame is rectangular and has first and second ends, first and second sides, and four corners.

5. The bed of claim 4, wherein said support means comprises four vertically oriented legs disposed one at each corner of said rectangular frame.

6. The bed of claim 5, wherein said elongate rod portions of said rectangular frame comprise four substantially horizontal elongate rod members disposed in interconnecting relation, with one elongate rod member between each adjacent pair of legs.

7. The bed of claim 6, wherein said elongate rod members disposed along said first and second sides of said frame are set at a common elevation, thereby, defining the elevation of said animal receiving surface.

8. The bed of claim 7, wherein said elongate rod members disposed along said first and second ends of said frame are set at a raised elevation above the elevation of said animal receiving surface.

9. The bed of claim 8, wherein said elongate rod members disposed along said first and second ends of said frame are set at a common raised elevation.

10. The bed of claim 9, further comprising a first reinforcing rod member disposed in interconnecting relation between the pair of legs at said first end of said frame, and a second reinforcing rod member disposed in interconnecting relation between the pair of legs at said second end of said frame.

11. The bed of claim 10, wherein said second web of flexible material passes under said reinforcing rod members.

12. The bed of claim 11, wherein said reinforcing rod members are disposed above the elevation of said animal receiving surface.

13. The bed of claim 12, further comprising a third web of flexible material extending outwardly from one end of said first web of flexible material and terminating at a outer end, which third web of flexible material defines a side wall of said bed.

14. The bed of claim 13, further comprising a third reinforcing rod member disposed in interconnecting relation between the pair of legs at said second side of said frame, and set at a raised elevation above the elevation of said animal receiving surface.

15. The bed of claim 14, wherein said third web of flexible material has at least one loop of material disposed at said outer end thereof, said loop of material at said outer end being dimensioned to receive said third reinforcing rod member therein, said third reinforcing rod member thereby defining the height of said side wall.

16. The bed of claim 15, wherein said loops of material in said first, second, and third webs of flexible material are substantially continuous across the widths of said first, second, and third webs of flexible material.

17. A bed for receiving domestic animals, said bed comprising:

a support means comprising four vertically oriented legs;

a web of flexible material presenting an animal receiving surface;

four substantially horizontal elongate rod members disposed in interconnecting relation, with one elongate rod member between each adjacent pair of legs, thereby defying a rectangular frame having first and second ends, first and second sides, and four corners;

a first reinforcing rod member disposed in interconnecting relation between the pair of legs at said first end of said bed, and a second reinforcing rod member disposed in interconnecting relation between the pair of legs at said second end of said bed, thereby defining the elevation of said animal receiving surface; and;

wherein said elongate rod members disposed along said first and second ends of said frame are set at a raised elevation above the elevation of said animal receiving surface.

18. The bed of claim 17, wherein said web of flexible material is securely attached at each of its opposed ends to said elongate rod members disposed along said first and second ends of said frame so as to span thereacross, and wherein said web of flexible material passes under said reinforcing rod members so as to span therebetween.

* * * * *